US012749960B2

(12) United States Patent
Weber et al.

(10) Patent No.: US 12,749,960 B2
(45) Date of Patent: Sep. 29, 2026

(54) TRANSPORT DEVICE AND METHOD FOR OPERATING A TRANSPORT DEVICE

(71) Applicant: B&R INDUSTRIAL AUTOMATION GMBH, Eggelsberg (AT)

(72) Inventors: Andreas Weber, Eggelsberg (AT); Alexander Almeder, Eggelsberg (AT); Jesper Spanggaard Rasmussen, Eggelsberg (AT)

(73) Assignee: ABB SCHWEIZ AG, Baden (CH)

( * ) Notice: Subject to any disclaimer, the term of this patent is extended or adjusted under 35 U.S.C. 154(b) by 346 days.

(21) Appl. No.: 18/566,328

(22) PCT Filed: Jun. 1, 2022

(86) PCT No.: PCT/EP2022/064872
§ 371 (c)(1),
(2) Date: Dec. 1, 2023

(87) PCT Pub. No.: WO2022/253883
PCT Pub. Date: Dec. 8, 2022

(65) Prior Publication Data

US 2024/0250597 A1 Jul. 25, 2024

(30) Foreign Application Priority Data

Jun. 2, 2021 (AT) .............................. A 50448/2021

(51) Int. Cl.
*H02K 41/03* (2006.01)
*B65G 54/02* (2006.01)
(Continued)

(52) U.S. Cl.
CPC ........... *H02K 41/031* (2013.01); *B65G 54/02* (2013.01); *H02K 11/25* (2016.01); *B60L 13/10* (2013.01);
(Continued)

(58) Field of Classification Search
CPC ............... B60L 13/10; B60L 2240/425; B60L 2240/62; B60L 2260/42; B60L 2260/44;
(Continued)

(56) References Cited

U.S. PATENT DOCUMENTS 5,783,877 A 7/1998 Chitayat
7,282,821 B2 10/2007 Kubo et al.
(Continued)

FOREIGN PATENT DOCUMENTS

| | | |
|---|---|---|
| EP | 3 653 428 | 5/2020 |
| EP | 3 706 297 | 9/2020 |
| WO | 2015/042409 | 3/2015 |

OTHER PUBLICATIONS

Int'l Search Report (Form PCT/ISA/210) conducted in Int'l Appln. No. PCT/EP2022/064872 (Sep. 20, 2022).
(Continued)

*Primary Examiner* — Naishadh N Desai
(74) *Attorney, Agent, or Firm* — GREENBLUM & BERNSTEIN, P.L.C.

(57) ABSTRACT

To enable a determination of the position of a transport unit in a transport device, having at least one transport segment along which at least one transport unit is moved at least one-dimensionally and on which a plurality of position sensors spaced apart from each other in the direction of movement are provided, independently of the input of heat during the operation of the transport device, a plurality of temperature sensors, spaced apart from each other in the direction of movement, are provided for detecting a local segment temperature of each transport segment and/or that a temperature model for calculating the local segment temperatures is stored in the control unit and that the control unit is configured to correct the position of the transport unit using a predefined correction model on the basis of the
(Continued)

Figure 1:
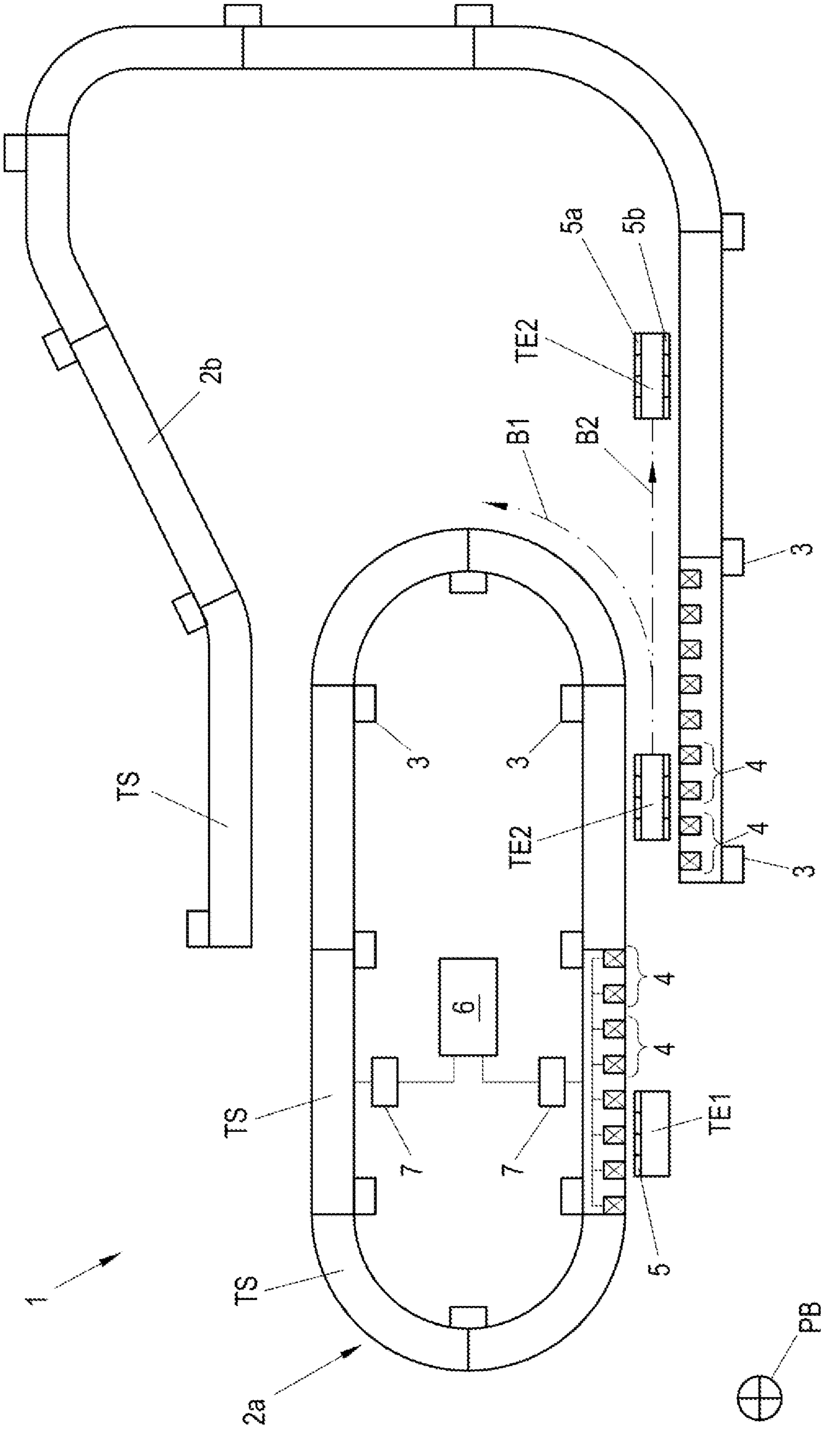

determined local segment temperatures to incorporate a thermal expansion of the transport segment.

19 Claims, 2 Drawing Sheets

(51) Int. Cl.
*H02K 11/25* (2016.01)
*B60L 13/10* (2006.01)

(52) U.S. Cl.
CPC . *B60L 2240/425* (2013.01); *B65G 2203/0283* (2013.01)

(58) Field of Classification Search
CPC . B60L 3/0038; B60L 3/12; B65G 2203/0283; B65G 54/02; H02K 1/20; H02K 11/215; H02K 11/25; H02K 11/33; H02K 2205/03; H02K 2213/03; H02K 2213/12; H02K 41/031; H02K 9/00; H02P 25/06; F16H 3/725; Y02T 10/62
See application file for complete search history.

(56) References Cited

U.S. PATENT DOCUMENTS

| | | | | |
|---|---|---|---|---|
| 9,202,719 | B2 | 12/2015 | Lu et al. | |
| 2001/0001248 | A1* | 5/2001 | Emoto | G03F 7/70716 355/53 |
| 2015/0233738 | A1* | 8/2015 | Vokinger | G01D 5/34746 250/231.1 |
| 2019/0131860 | A1* | 5/2019 | Suzuki | B23Q 7/14 |
| 2020/0287493 | A1* | 9/2020 | Flixeder | B60L 13/006 |
| 2021/0402881 | A1* | 12/2021 | Hanis | B60L 3/0061 |

OTHER PUBLICATIONS

Int'l Written Opinion (Form PCT/ISA/237) conducted in Int'l Appln. No. PCT/EP2022/064872 (Sep. 20, 2022).
Int'l Prelim. Exam. Report (Form PCT/ISA/409) conducted in Int'l Appln. No. PCT/EP2022/064872 (Sep. 18, 2023).

* cited by examiner

TRANSPORT DEVICE AND METHOD FOR OPERATING A TRANSPORT DEVICE

The invention relates to a transport device having at least one transport segment, along which at least one transport unit is moved at least one-dimensionally, wherein a plurality of position sensors, spaced apart from each other in the direction of movement, are provided on the transport segment to generate a sensor signal, whenever the transport unit is located in a sensor range of the corresponding position sensor, wherein a control unit is provided in the transport device, which control unit is configured to determine a transport unit position of the transport unit relative to a defined reference point of the transport device as a function of the sensor signals of the position sensors that are received. The invention also relates to a method for operating a transport device having at least one transport segment along which at least one transport unit is moved at least one-dimensionally, wherein a plurality of position sensors, spaced apart from one another in the direction of movement, are provided on the transport segment, wherein the position sensors each generate a sensor signal, when the transport unit is moved into a sensor range of the corresponding position sensor, wherein a control unit determines, on the basis of the received sensor signals of the position sensors, a transport unit position of the transport unit relative to a defined reference point of the transport device.

In a linear motor, a primary part (stator) and a secondary part (mover) are provided, wherein the secondary part is movable relative to the primary part. Drive coils are arranged on the primary part, and drive magnets are arranged on the secondary part, or vice versa. The drive magnets are designed as permanent magnets, electrical coils, or short-circuit windings. The drive coils are electrical coils that are energized to generate an electromagnetic field by applying a coil voltage. The interaction of the (electro-) magnetic fields of the drive magnets and the drive coils exerts forces on the secondary part, which move the secondary part relative to the primary part. The linear motor can be designed, for example, as a synchronous machine or as an asynchronous machine. The drive coils of the linear motor are arranged either in a direction of movement in succession, or in a plane of movement. The secondary part can be moved along this one direction of movement or can be moved at least two-dimensionally within the movement plane in the two directions of movement. A distinction can also be made between short-stator linear motors and long-stator linear motors, wherein, in the long-stator linear motor, the secondary part is shorter or smaller than the primary part, and, in the short-stator linear motor, the primary part is shorter or smaller than the secondary part.

Long-stator linear motors are understood to mean both linear long-stator linear motors having one-dimensional movement of the secondary part in a direction of movement, and planar long-stator linear motors having at least two-dimensional movement of the secondary part in a plane of movement, which are often also called planar motors. In long-stator linear motors, a plurality of secondary parts is usually moved simultaneously and independently of one another along the primary part (in a direction of movement or in a plane of movement). Long-stator linear motors are therefore often used in electromagnetic transport systems, in which a plurality of transport units (secondary parts) for carrying out transport tasks are moved simultaneously. The primary part (stator) forms a transport path or a transport plane along which the transport units can be moved.

It is also already known to modularly construct a long-stator linear motor. The transport route or transport plane (primary part) can be subdivided into several separate elements, which are hereafter also called transport segments. Each transport segment thus forms a part of the primary part, wherein a specific number of drive coils can be arranged on each transport segment. Individual, and preferably standardized, transport segments can then be joined together to form a transport path or transport plane of the desired length and/or shape. For example, WO 2015/042409 A1 discloses such a modularly-constructed, linear long-stator linear motor. U.S. Pat. No. 9,202,719 B1 discloses a long-stator linear motor in the form of a planar motor having stator modules.

To energize the drive coils, power electronics are generally provided which implement the required electrical control variables of the drive coils—for example, a coil voltage, a coil current, or a magnetic flux. In the power electronics, electrical component parts are installed that are loaded during operation—for example, by electrical currents flowing therethrough. However, the permissible electrical currents are limited by the component parts and/or the electrical configuration of the power electronics. By energizing the drive coils by applying a coil voltage, heat is also generated on the transport segment, as a result of which the temperature of a transport segment can rise. It is therefore already known to cool the stator of a linear motor. For example, U.S. Pat. No. 5,783,877 A or U.S. Pat. No. 7,282,821 B2 discloses cooling of a stator of a linear motor, wherein lines are arranged in the stator or in a component part in contact with the stator, through which a coolant is conducted. The coolant thus absorbs heat from the stator and dissipates it. The cooling of the stator of a long-stator linear motor, wherein stator can extend over a great length, is, however, structurally complex and also increases the costs—in particular, for long stator lengths such as when used as a transport device. Cooling is therefore often not provided.

The movement of the individual transport units is generally controlled via one or more suitable control unit(s) of the transport device. Fixedly predefined movement profiles, e.g., a specific path-time profile or speed-time profile, can be implemented, for example, in the control unit or, for example, can be specified by a higher-level system control unit. The control unit uses these profiles to calculate suitable manipulated variables for the drive coils, e.g., current or voltage, and controls the drive coils accordingly via the power electronics to set or adjust the corresponding movement profile. One or more suitable controllers can also be provided to adjust certain target variables, for example, a target position of a transport unit along the transport path or the transport plane. In order to provide an actual variable required for the regulation, one or more sensors are usually provided along the transport path or the transport plane.

For example, suitable position sensors are often provided, e.g., in the form of known magnetic position sensors, and in particular anisotropic magnetoresistive sensors, also called AMR sensors, or tunnel magnetoresistive sensors, also called TMR sensors. These sensors can be used to detect the presence of the transport units with contact, if the transport unit or a part thereof is in the sensor range, in particular the magnetic field generated by the drive magnets of the transport unit. Since the installation positions of the sensors relative to a defined reference point of the transport device are generally known, an unambiguous assignment of the positions of the transport units to the reference point of the transport device or to another known reference point can take place.

During operation of the transport device, the aforementioned input of heat can result in different thermal expansions of individual components of the transport device, in particular of a transport segment. Under certain circumstances, this can lead to the position of a transport unit determined by the control unit using the position sensors deviating from an actual position. This can lead to problems, for example, in transport processes in which the movement of the transport units is synchronized with the movement of one or more external devices. For example, it can be intended that an object transported by a transport unit is to be received at a predetermined position by a handling device, such as an industrial robot, or an object is to be placed on the transport unit, or an object is to be processed on a moving transport unit during movement. If the position determination of the transport unit, and thus the position control, are not correct, this can lead to problems in the placement or receiving or processing due to a position deviation, which is of course undesirable.

It is therefore an object of the invention to provide a transport device and a method for operating a transport device which enable the most precise possible position determination of a transport unit, independently of the input of heat during operation of the transport device.

The object is achieved according to the invention by a transport device mentioned above, in that a plurality of temperature sensors, spaced apart from one another in the direction of movement, is provided in the transport device, preferably on the transport segment, for detecting a local segment temperature of the transport segment in each case, and/or in that a temperature model for calculating the local segment temperatures is stored in the control unit, and in that the control unit is configured to correct the transport unit position based on the determined local segment temperatures using a predefined correction model to take into account a thermal expansion of the transport segment. As a result, the position of the transport unit during operation can be corrected as a function of local thermal expansions of the transport segment, which result, for example, from a heat input to the drive coils. As a result, locally different heat inputs, and consequently locally different thermal expansions of the transport segment, can be taken into account, whereby a more accurate position correction is achieved. Locally different heat inputs can arise, for example, when the drive coils are controlled individually and loaded to different degrees. Different thermal expansions at various points of the transport segment can thereby advantageously be taken into account.

In the simplest case, a characteristic curve could be stored in the control unit, for example, wherein the corrected transport unit position is mapped as a function of the segment temperature in the characteristic curve. However, a characteristic map could also be stored, in which the corrected transport unit position is mapped as a function of the segment temperature and one or more further parameters. The temperature sensors could, for example, be arranged directly on the transport segment. However, temperature sensors could also be used, for example, which are arranged at a distance from the transport segment and which are suitable for detecting the temperature remotely, such as infrared sensors.

The correction model preferably comprises a temperature-dependent correction factor of the transport segment, and the control unit is configured to multiply the determined transport unit position by the temperature-dependent correction factor to correct the transport unit position. As a result, the thermal expansion is taken into account in a simple manner by a factor which can be determined experimentally, for example.

In an advantageous embodiment, a sensor position for a predefined reference temperature is defined for each of a plurality of positions sensor. The correction model then comprises the determination of a sensor offset for each of the position sensors using the determined local segment temperatures, the reference temperature, and a predefined expansion factor of the transport segment, and the control unit is configured to determine a corrected sensor position for each position sensor using the determined sensor offsets and to correct the transport unit position using the corrected sensor positions. A physical relationship of the thermal expansion as a function of a temperature difference and as a function of an expansion factor can thereby be used for correcting the transport unit position. In the simplest case, an empirical factor or an experimentally determined factor can be used as an expansion factor, for example.

At least one of the temperature sensors is preferably arranged at the same position as one of the position sensors on the transport segment, and/or at least one of the position sensors and at least one of the temperature sensors are structurally combined. On the one hand, the temperature measurement can thereby advantageously take place directly at the location of the position measurement and, on the other, fewer sensors are required, as a result of which the design is simplified.

It is advantageous, if the transport segment has a segment carrier, which is attached—preferably centrally in the direction of movement—to a stationary guide device of the transport device with a fixed bearing having a known attachment position relative to the defined reference point of the transport device, wherein the plurality of position sensors are arranged on the segment carrier, and that the control unit is configured to correct the transport unit position starting from the attachment position, in particular to determine the sensor offsets of the position sensors starting from the attachment position. A substantially free thermal expansion in the direction of movement is thereby enabled, as a result of which thermal-induced stresses are kept low. Since the thermal expansion starts from a known point, a simple position correction can be carried out in two directions.

On the transport segment, preferably on the segment carrier, at least one stator unit is preferably provided on which several drive coils are arranged one behind the other in at least one arrangement direction defining a direction of movement of the transport unit, wherein the drive coils are controllable by the control unit to electromagnetically interact with the transport unit to generate a drive force for at least one-dimensional movement of the transport unit in the direction of movement. Alternatively, on the transport segment, preferably on the segment carrier, a stator unit can be provided, on which several drive coils are arranged one behind the other in at least two different arrangement directions, which each define a direction of movement of the transport unit, wherein the drive coils are controllable by the control unit to interact electromagnetically with the transport unit to generate a drive force for at least two-dimensional movement of the transport unit in the two directions of movement. As a result, the position correction can be used both in a long-stator linear motor with a one-dimensional direction of movement of the transport unit, and in a planar motor with a multi-dimensional direction of movement.

Preferably, the plurality of position sensors and/or the plurality of temperature sensors are arranged on a sensor plate running parallel to the transport segment, and in particular to the stator unit, in the direction of movement, wherein the sensor plate is preferably arranged on the segment carrier. The structure and assembly of the transport segment are thereby simplified.

Preferably, the stator unit is formed from a ferrous material having a known coefficient of expansion, and/or the segment carrier is formed from a material, preferably containing aluminum, with a known coefficient of expansion, and the coefficient of expansion of the stator unit and/or the coefficient of expansion of the segment carrier are taken into account in the correction model. A modular design of the transport device can thereby be made possible, wherein an advantageous material, the thermal expansion properties of which can be taken into account in the position correction, can be used for each component.

In another advantageous embodiment, the correction model comprises the determination of a displacement of the sensor plate based on a temperature of the sensor plate, a displacement coefficient of the sensor plate, and the reference temperature, and the control unit is configured to determine a total sensor offset of the at least one position sensor from the displacement of the sensor plate and the determined sensor offset, and to use the total sensor offset to determine the corrected sensor position. As a result, a displacement of the entire sensor plate that is equal for each position sensor can also be taken into account, when calculating the corrected transport unit position.

Furthermore, the object is achieved by the method mentioned at the start in that a local segment temperature of the transport segment is detected by a plurality of temperature sensors spaced apart from one another in the direction of movement, and/or in that local segment temperatures of the transport segment (TS) are determined by a temperature model of the transport segment implemented in the control unit, and in that the control unit corrects the transport unit position based on the determined local segment temperatures using a predefined correction model to take into account a thermal expansion of the transport segment.

Advantageous embodiments of the method are specified in the dependent claims 11 through 16.

The present invention is described in greater detail below with reference to FIGS. 1 and 2, which show schematic and non-limiting advantageous embodiments of the invention by way of example. In the figures FIG. 1 shows a transport device in the form of a long-stator linear motor in a preferred embodiment, FIG. 2 shows a transport segment of the transport device in a plan view and in a side view.

Figure 2:
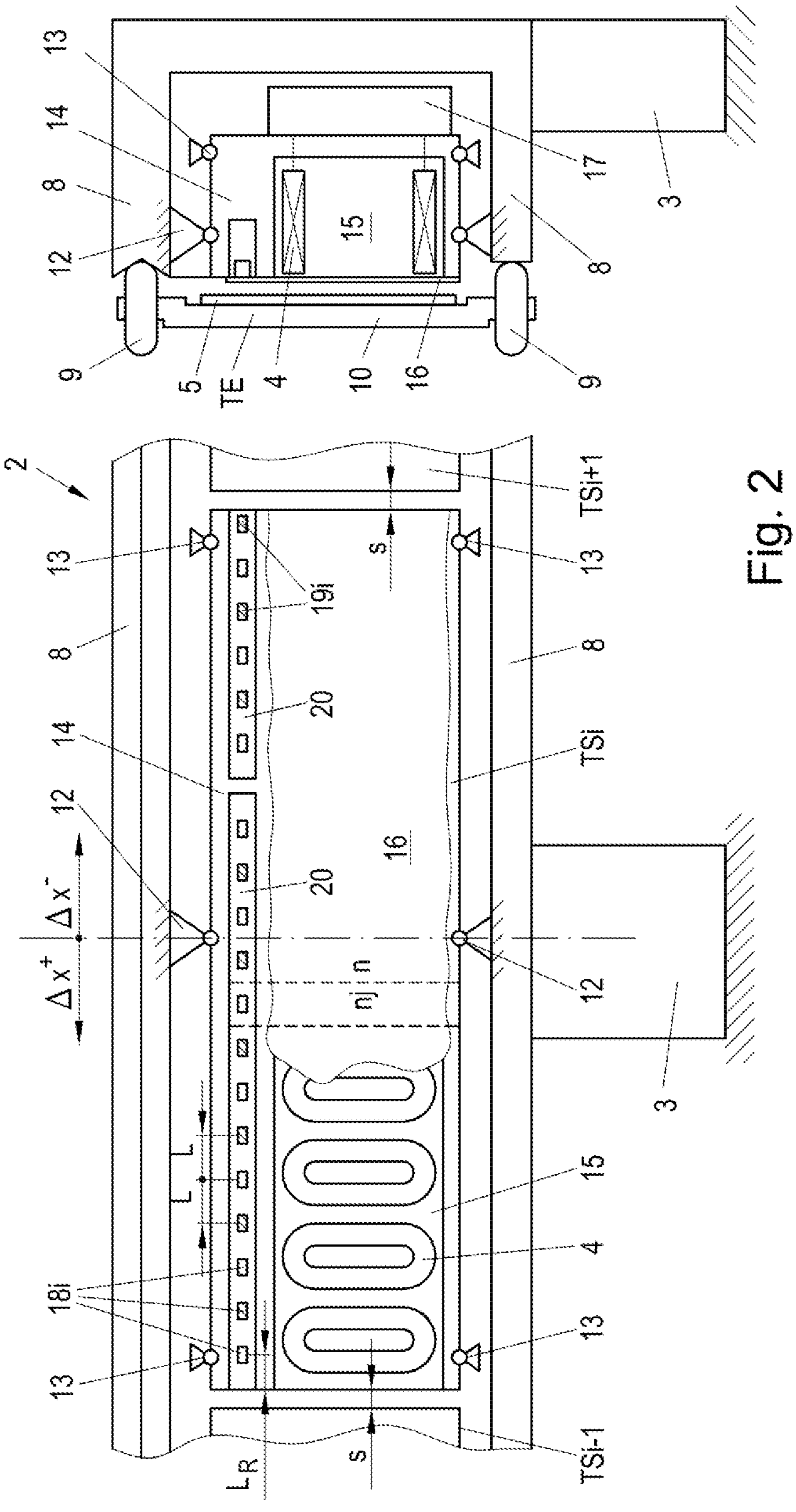

FIG. 1 shows a transport device 1 in the form of a long-stator linear motor (LLM) in a schematic view from above. The structure and the function of an LLM are well known, which is why only the points essential for the invention will be discussed in more detail. The transport device 1 has a transport path 2, which is modularly constructed from a plurality of transport segments TS. One or more transport units TE can be moved along the transport path 2 in a known manner by electromagnetic force formation. For this purpose, a plurality of drive coils 4, which form a direction of movement for the transport units TE, are arranged one behind the other on the transport path 2 in a known manner. Several drive magnets 5 of differing magnetic polarity are arranged on the transport units TE one behind the other in the direction of movement. The drive magnets 5 face the drive coils 4 of the transport path 2 and interact magnetically with the drive coils 4 in order to generate a drive force, by which the transport unit TE can be moved along the transport path 2. For example, several permanent magnets of differing magnetic polarity can be provided as drive magnets 5.

An air gap in which a magnetic circuit forms is generally provided between the drive magnets 5 and the drive coils 4. In addition to the drive force, a holding force can also be generated by which the transport units TE are held on the transport path 2. In the case of an LLM configured as a planar motor, a reverse levitation force, instead of the holding force, can also be generated by which the transport unit TE is held in suspension in order to maintain the air gap. A suitable guide device 8 (see FIG. 2) can also be provided on the transport path 2 and interacts with suitable guide elements of the transport units TE that are, for example, rotatably-mounted wheels 9. On the one hand, it can thereby be ensured that the transport units TE do not undesirably detach from the transport path 2—for example, due to cornering forces. On the other hand, the air gap can as a result also be kept substantially constant, which improves the control.

In the example shown, the direction of movement is predefined by the structure or the shape of the transport path 2, so that a one-dimensional movement of the transport units TE in the predetermined direction of movement is possible. However, the "one-dimensional" embodiment shown is to be understood only by way of example, because, as mentioned at the beginning, an LLM can of course also be configured as a so-called planar motor in which the transport segment(s) TS form a transport plane in which one or more transport units TE can be moved at least two-dimensionally in several directions of movement. In a planar motor, the drive coils are therefore arranged not just one behind the other in a one-dimensional arrangement direction, but in several arrangement directions.

For example, a first group of drive coils 4 can be arranged one behind the other in a first arrangement direction, and a second group of drive coils 4 can be arranged one behind the other in a second arrangement direction different from the first arrangement direction. The first group of drive coils 4 can, for example, be arranged in a first plane, and the second group of drive coils 4 can be arranged in a second plane lying above or below the first plane. However, an arrangement in the same plane would also be possible. The two arrangement directions can, for example, be normal to one another or at a different angle to one another. The invention is described below by way of example with reference to the one-dimensional transport device 1 shown. However, a multi-dimensional transport device in the form of a planar motor is of course also comprised by the invention.

Here, the transport path 2 has two separate transport line portions 2*a*, 2*b*, which are each constructed from several transport segments TS. Of course, more or fewer transport route portions 2*i* could also be provided. In the simplest case, only a single transport segment TS could also be provided, which segment forms the transport path 2. The transport segments TS can be attached to suitable stationary holding devices 3, which in turn are arranged in a stationary manner—for example, on the base. In the example shown, the holding devices 3 are connected by a guide device 8 (not shown in FIG. 1). The holding devices 3 and the guide device 8 together form a stationary construction on which the individual transport segments are held.

The regions in which the two transport line portions 2*a*, 2*b* overlap are so-called transfer positions, at which suitable transport units TE can be transferred between the transport line portions 2*a*, 2*b*. A suitable transport unit TE is understood here to mean a transport unit TE which has drive magnets 5a, 5b on opposite sides, as shown by way of example on the basis of the transport unit TE2. The transport unit TE2 can therefore be moved along the closed first transport line portion 2a by the drive coils 4 of the first transport line portion 2a interacting with the drive magnets 5a, as indicated by the movement path B1. However, the transport unit TE2 can also be transferred to the second transport route portion 2b, which is open here, and can be moved along the second transport line portion 2a, in that the drive coils 4 of the second transport line portion 2a interact with the drive magnets 5b.

The movement of the transport units TE is controlled via a suitable control unit 6, which can be configured, for example, as suitable hardware and/or software. The control unit 6 can, for example, in turn communicate with a higher-level plant control unit (not shown), e.g., in order to synchronize the movement of the transport units TE with a movement of an external device—for example, a handling device, such as an industrial robot. A suitable controller, with which specific movement variables of the transport units TE, e.g., position, speed, etc., can be adjusted, can also be implemented in the control unit 6. For example, further subordinate control units can also be provided, which are controlled by the control unit 6.

For example, a separate segment control unit 7 can be provided per transport segment TS in order to control the drive coils 4 of the corresponding transport segment TS. In FIG. 1, this is shown as representative only for two transport segments TS. On the transport segments TS, power electronics (not shown) are usually also provided, which provide the required electrical variables (current, voltage) for the drive coils 4 in a suitable manner. Depending upon the desired movement profile of a transport unit TE, the control unit 6 controls the drive coils 4 accordingly in order to generate a moving magnetic field in the direction of movement by which the transport units are moved in the desired manner. Each drive coil 4 can preferably be actuated individually and independently of the other drive coils 4.

FIG. 2 shows on the left a detail of the transport path 2 in the region of a transport segment TS in a view from the front (normal to the direction of movement) without a transport unit TE. FIG. 2 shows the side view (in the direction of movement) with transport unit TE. As has been described with reference to FIG. 1, the transport segments TS can be attached to one or more suitable stationary holding devices 3, wherein only one holding device 3 is shown in FIG. 2. A guide device 8 is provided on the holding device 3. The guide device 8 preferably extends continuously, i.e., without interruption, along the entire transport path 2. The guide device 8 can, for example, be fixedly connected to the holding device 3—for example, screwed thereto. In the example shown, the guide device 8 has an upper guide rail and a lower guide rail. Rotatable rollers or wheels 9 which interact with the guide device 8 can be arranged on the transport unit TE. For example, the transport unit TE can have a main body 10 on which the drive magnets 5 are arranged on one side (or on opposite sides). The wheels 9 can be rotatably mounted on the side of the main body 10. In the example shown, the upper guide rail 8 has a groove in which the wheel or wheels 9 roll. As a result, the transport unit TE can be guided laterally, i.e., transversely to the direction of movement.

In the example shown, the transport segments TS are attached to the guide device 8. The fastening preferably takes place in such a way that a thermal expansion of the transport segment TS in the direction of movement is possible, so that undesirable mechanical stresses and, possibly, deformations do not occur. In the example shown, the transport segment TS is attached to the guide device 8 on a fixed bearing 12, centrally arranged in the longitudinal direction of the transport segment TS, and two floating bearings 13, each provided in the region of the ends. The bearings 12, 13 are shown only schematically in FIG. 2 and can be configured structurally in a suitable manner. The transport segment TS is thus fixedly connected to the guide device 8 on the fixed bearing 12, so that no relative movement takes place in the event of a thermal expansion of the transport segment TS. The thermal expansion is absorbed by the floating bearings 13, so that the transport segment TS can expand substantially symmetrically about the center in opposite directions starting from the fixed bearing 12. Successive transport segments TS are therefore preferably arranged on the guide device 8 at a distance from one another when viewed in the direction of movement, as indicated by way of example in FIG. 2 on the basis of the transport segments TSi, TSi+1, TSi−1.

In the example shown, the transport segment TS has a segment carrier 14 and a stator unit 15 arranged on the segment carrier. The segment carrier 14 can be formed, for example, from aluminum or an aluminum-containing material. The stator unit 15 is preferably made of iron or a suitable ferrous material. The drive coils 4 are attached in a suitable manner on the stator unit 15. The stator unit 15 thus advantageously forms the iron core for the drive coils 4. A segment cover 16 made of a suitable metallic material can also be provided on the side, facing the transport unit TE, of the transport segment TS in order to shield at least the drive coils 4 and to form a substantially closed surface. The power electronics 17, which are electrically connected to the drive coils 4 in a suitable manner, can be arranged on the rear side, opposite the drive coils 4, of the transport segment TS. The power electronics 17 can be configured, for example, in the form of one or more known circuit boards or printed circuit boards, on which corresponding electronic components are provided.

A plurality i of position sensors 18i spaced apart from one another in the direction of movement, each having a fixed sensor position $X_i$, are also provided on the transport segment TS. The position sensors 18i each generate a sensor signal when a transport unit TE, and in particular the magnetic field generated by the drive magnets 5, is located in a sensor range of the corresponding position sensor 18. The position sensors 18i are preferably arranged at fixed sensor position Xi on the transport segment TS, wherein the sensor positions Xi can be fixed, for example, relative to a stationary reference point PB of the transport device 1, which can, for example, be on the guide device 8 or at any other location (FIG. 1). The sensor positions Xi of the position sensors 18i are preferably fixed for a predefined reference temperature $\vartheta_B$—for example, an average ambient temperature in the range of 20° ° C. to 30° C.

The position sensors 18i are arranged at fixed and preferably constant sensor spacings L=constant in the direction of movement from one another, as shown in FIG. 2. However, irregular distances of L≠constant could also be provided. The sensor distances L can, for example, each be measured from the center of two adjacent position sensors 18i and can, for example, be in the range of 5 to 30 mm. For example, all position sensors 18i could be spaced apart at constant intervals up to the two position sensors 18i at the two ends of the transport segment TS. The two position sensors 18i at the ends can, for example, be at a smaller distance from the respective sensor located in front, so that a sufficiently large distance from the corresponding segment end is provided. In addition, in the region of the transition between two transport segments TSi−1, TS, TSi+1, an additional position sensor 18 (not shown) could optionally be provided for the special observation of the conditions in the transition region between the transport segments TS−1, TS, TSi+1.

The sensor positions $X_i$ fixed for the number i of position sensors 18*i* can, for example, in turn be related to the stationary reference point PB (FIG. 1) of the transport device 1. The sensor signals detected by the position sensors 18*i* are transmitted to a control unit, such as the control unit 6 (FIG. 1) of the transport device 1. On the basis of the received sensor signals of the position sensors 18*i*, the control unit 6 then determines the transport unit position of the transport unit TE relative to the reference point BP of the transport device 1. On the basis of the reference point PB, the transport unit position can be synchronized, for example, with a handling device, such as an industrial robot.

The position sensors 18*i* can, for example, be arranged on a sensor plate 20 running parallel to the stator unit 15 in the direction of movement. In the example shown, for example, two separate sensor plates 20 are provided, which plates are arranged between the upper guide rail of the guide device 8 and the stator unit 15 on the segment carrier 14. Of course, more or fewer sensor plates 20 could also be used, and the arrangement of the sensor plate(s) 20 could also be at a different location on the transport segment TS. The at least one sensor plate 20 is in any case arranged such that the position sensors 18*i* located thereon can recognize the presence of a transport unit TE in the sensor range. Analogous to the power electronics 17, the sensor plates 20 can be designed, for example, as known circuit boards or printed circuit boards, and the position sensor(s) 18 can be designed in the form of known AMR sensors or TMR sensors.

As mentioned at the beginning, during operation of the transport device 1, a development of heat generally occurs on the transport segment TS, and in particular in the region of the drive coils 4 and the power electronics 17. This results in an increase in segment temperature 9*s* of the transport segment TS, which subsequently leads to a thermal expansion of the transport segment TS in the direction of movement. The height of the thermal expansion depends, for example, upon the reference temperature $\vartheta_B$, the segment temperature 9*s*, and the materials used for the components of the transport segment TS.

In the example shown, the segment carrier 14 is formed from aluminum with a corresponding coefficient of expansion αAL, the stator unit 15 is formed from iron with a corresponding coefficient of expansion αFE, and the sensor plates 20 are formed from a suitable plastic with a corresponding coefficient of expansion αKU. αAL>αFE>αKU, applies here, wherein αKU is substantially negligible. It can be seen from this that the sensor plate(s) 20 are subjected to a negligibly low thermal expansion compared to the stator unit 15 and the segment carrier 14. In the event of a temperature increase, the stator unit 15 and the segment carrier 14 thus expand differently, but the position sensors 18*i* or the sensor plate(s) 20 only very slightly. In addition, the entire sensor plate 20 can be subjected to a displacement by the mechanical stresses that occur. In the event of an increase in temperature, these effects then lead to the occurrence of certain sensor offsets ΔXi of the position sensors 18*i* relative to the respectively known sensor position Xi as seen in the direction of movement, so that the transport unit position determined by the control unit 6 is no longer correct.

According to the present invention, therefore, a plurality i of temperature sensors 19*i* spaced apart from one another in the direction of movement for detecting a local segment temperature $\vartheta_{Si}$ of the transport segment TS are provided in the transport device 1, and in particular on the transport segment TS. Alternatively or additionally, a temperature model can be used in the control unit 6 for determining the local segment temperatures $\vartheta_{Si}$ of the transport segment TS. The control unit 6 is configured to correct the transport unit position on the basis of the determined local segment temperatures $\vartheta_{Si}$ by means of a predefined correction model, in order to take into account a thermal expansion of the transport segment TS. The temperature sensors 19*i* can be arranged, for example, directly on the transport segment TS, preferably on the sensor plate 20, in order to record the local segment temperatures $\vartheta_{Si}$ of the transport segment TS directly, as shown in FIG. 2. However, suitable sensors which can record the local segment temperatures $\vartheta_{Si}$ of the transport segment TS could in principle also be used remotely as temperature sensors 19*i*, such as infrared sensors. Such sensors therefore need not necessarily be arranged directly on the transport segment TS, but could, for example, also be arranged at a distance from the transport segment TS—for example, on a suitable stationary construction (not shown).

For example, in the simplest case, a characteristic curve can be used as a correction model in which the corrected transport unit position is depicted as a function of the local segment temperatures $\vartheta_{Si}$. However, a characteristic map could also be used as a correction model in which the corrected transport unit position is depicted as a function of the local segment temperatures $\vartheta_{Si}$ and at least one further parameter. By means of the further parameter or parameters, further influencing variables can be taken into account, for example, which influence the thermal expansion of the transport segment TS, e.g., a structural design of the transport segment TS, materials used, or the reference temperature $\vartheta_B$ at which the sensor positions Xi were fixed. The correction model (particularly the characteristic curve or the characteristic map) can be stored, for example, as a known look-up table in the control unit 6 or in a superordinate (plant) control unit with which the control unit 6 communicates. Depending upon the detected or determined local segment temperature $\vartheta_{Si}$, the control unit 6 can determine a corrected transport unit position during operation of the transport device 1 from the correction model.

The correction model can comprise, for example, a temperature-dependent correction factor of the transport segment TS, and the control unit 6 can be configured to multiply the determined transport unit position by the temperature-dependent correction factor in order to correct the transport unit position and thus to determine a corrected transport unit position. The correction model generally, and in particular the correction factor, can, for example, be determined experimentally by tests, or can also be based upon physical relationships. For example, a measurement of the transport unit position could take place at different temperatures, and the measured transport unit positions could be stored in the correction model as corrected transport unit positions as a function of the local segment temperatures $\vartheta_{Si}$.

Advantageously, the sensor positions Xi of the position sensors 18*i* on the transport segment TS are fixed for a predetermined reference temperature $\vartheta_B$, e.g., 20-30° C., and the correction model comprises the determination of a sensor offset ΔXi for each position sensor 18*i* (seen in the direction of movement) on the basis of the determined local segment temperatures $\vartheta_{Si}$ (by the temperature sensors 19*i* and/or the temperature model), the reference temperature $\vartheta_B$, and a predefined expansion factor K of the transport segment TS. The control unit 6 can then determine a corrected sensor position $Xi_{corr}$ for the position sensors 18*i* on the basis of the respectively determined sensor offset ΔXi, and correct the transport unit position on the basis of the corrected sensor position $Xi_{corr}$.

In order to determine the sensor offsets ΔXi, in the control unit 6, for example, a characteristic curve or a characteristic map (e.g., as a look-up table) can in turn be stored in which the sensor offset ΔXi or the corrected sensor position $Xi_{corr}$ of the position sensors 18*i* is depicted at least as a function of the segment temperature $\vartheta_{Si}$. For example, a known physical relationship of the thermal expansion can thereby be used to determine the sensor offsets ΔXi or, directly, to determine the corrected sensor positions $Xi_{corr}$ of the position sensors 18*i*, which takes into account a temperature difference between the local segment temperature $\vartheta_{Si}$ and the reference temperature $\vartheta_B$ (e.g., the average ambient temperature) and an expansion factor K.

The expansion factor K depends substantially upon the materials used and upon the structural design and the installation situation of the transport segment TS, and can be regarded as known. An empirical value, for example, can be used as expansion factor K, or the expansion factor K can also be determined experimentally—for example, by measuring the thermal expansion at different temperatures. However, the expansion factor K could also be determined analytically, for example. If the transport segment TS—in particular, the segment carrier 14 as shown in the example with a central fixed bearing 12—is attached to the stationary structure of the transport device 1 (guide device 8+holding device 3) with a known attachment position relative to the defined reference point PB of the transport device 1, the control unit 6 can then determine the sensor offsets ΔXi of the position sensors 18*i* starting from the attachment position of the fixed bearing 12. A positive sensor offset $\Delta X^+$ and a negative sensor offset $\Delta X^-$ thus result, as indicated in FIG. 2.

The determination of local segment temperatures $\vartheta_{Si}$ is advantageous in order to be able to take into account locally different temperatures and, consequently, locally different thermal expansions. This can be the case, for example, if different drive coils 4 are loaded to different degrees seen in the direction of movement, e.g., due to a specific predefined transport process, so that they generate different inputs of heat.

Preferably, at least one of the temperature sensors 19*i* is arranged at the same position as one of the position sensors 18*i*, or at least one of the position sensors 18*i* is structurally combined with one of the temperature sensors 19*i*. In the example shown, for example, each second position sensor 18*i* is also formed as a temperature sensor 19*i* for detecting the local segment temperature $\vartheta_{Si}$ in the region of the corresponding temperature sensor 19*i*, as symbolized by the hatched blocks. For example, the aforementioned AMR sensor can be used as a combined sensor for detecting the position and temperature. The local segment temperature $\vartheta_{Si}$ in the region of a position sensor 18*i* located between two temperature sensors 19*i* at which no temperature measurement takes place can be averaged here from the local segment temperatures $\vartheta_{Si}$ of the adjacent temperature sensors 19*i*. The temperature sensor(s) 19*i* can, for example, be arranged analogously to the position sensors 18*i* on the sensor plate 20 running parallel to the stator unit 15 in the direction of movement. In the example shown, for example, two separate sensor plates 20 are provided. However, more or fewer sensor plates 20 could of course also be provided.

The stator unit 15 preferably forms the iron core for the drive coils 4 and can therefore, as mentioned, be formed from a ferrous material having a known coefficient of expansion FE. The control unit 6 can then take into account the coefficient of expansion $\alpha_{FE}$ of the stator unit 15 in the correction model for correcting the transport unit position, e.g., in the expansion factor K, in the determination of the sensor offsets ΔXi or the corrected sensor positions $Xi_{corr}$ of the position sensors 18*i*. As described, the segment carrier 14 is preferably made of aluminum with a corresponding known coefficient of expansion $\alpha_{AL}$. The control unit 6 can thus optionally also take into account the coefficient of expansion CAL of the segment carrier 14 in the correction model for correcting the transport unit position—for example, in turn in the expansion factor K of the correction model for the determination of the sensor offsets ΔXi of the position sensors 18*i*.

The transport segment TS can, for example, be subdivided into a plurality j of expansion zones nj as seen in the direction of movement, and an expansion $\Delta L_{nj}$ can be calculated for each expansion zone nj. The sensor offset $\Delta X_i$ for a specific position sensor 18*i* can then be a sum or an integral of the individual expansions $\Delta L_{nj}$ of the expansion zones nj. For example, the length of the expansion zones nj can correspond to the sensor distance L, so that one position sensor 18*i* is provided per expansion zone nj, as indicated in FIG. 2. In this case, the number j of expansion zones nj corresponds to the number i of position sensors 18*i*. In principle, however, several position sensors 18*i* could also be arranged in an expansion zone nj. In this case, the same sensor offset $\Delta X_i$ is determined for all position sensors 18*i* of an expansion zone nj.

If the position sensor 18*i* of an expansion zone nj is at the same time a temperature sensor 19*i*, the local segment temperature $\vartheta_{Snj}$ for the respective expansion zone nj can be detected directly, i.e., $\vartheta_{Snj}=\vartheta_{Si}$. For an expansion zone nj without temperature sensor 19*i*, the corresponding local segment temperature $\vartheta_{Snj}$ can be averaged, e.g., from the detected local segment temperatures $\vartheta_{Snj}$ of the adjacent expansion zones nj+1, nj−1. When the transport segment TS according to FIG. 2 is attached, the transport segment TS expands in both directions starting from the fixed bearing 12, e.g., substantially symmetrically with respect to the fixed bearing 12, when there is a uniform heating of the transport segment TS. As a result, it turns out that a position sensor 18*i* arranged in the region of the fixed bearing 12 has a lower sensor offset $\Delta X_i$ than a position sensor 18*i* arranged farther away from the fixed bearing 12 (e.g., in the region of the floating bearing 13). The expansion $\Delta L_{nj}$ of an expansion zone nj can be determined by the following relationship, $$\Delta L_{nj} = K_{nj}^{*}(\vartheta_{Snj} - \vartheta_B)$$

with an expansion factor $K_{nj}$ and a (local) segment temperature $\vartheta_{Snj}$ of the respective expansion zone nj and with a reference temperature $\vartheta_{Snj}$ of, for example, 20-30° C. If the length of the expansion zones nj corresponds to the sensor distance L, as shown, the local segment temperature $\vartheta_{Si}$ detected in each case by the temperature sensors 19*i* can then be used as the local segment temperature $\vartheta_{Snj}$ of the expansion zones nj. However, all expansion zones nj of the same expansion factor $K_{nj}$=K, for example, can also be used. The above relationship is then simplified to $\Delta L_{nj}=K^*(\vartheta_{Snj}—\vartheta_B)$ The individual expansions $\Delta L_{nj}$ in both directions starting from the fixed bearing 12 can then be summed up in order to determine the sensor offset $\Delta X_i$ of the respective position sensor 18*i*.

Additionally, a displacement of the entire sensor plate 20 according to the following relationship can optionally also be taken into account in the correction model. The displacement of the entire sensor plate 20 is thus of equal magnitude for each position sensor 18*i* on the sensor plate 20.

$$X_{offset} = K_P^*(\vartheta_P - \vartheta_B)$$

Here, $X_{offset}$ is the displacement of the entire sensor plate 20, $K_P$ is the displacement coefficient, and $\vartheta_P$ is the temperature of the sensor plate 20, which, for example, can correspond to a measured or modeled local segment temperature $\vartheta_{Si}$ (or a central local segment temperature $\vartheta_{Si}$). $\vartheta_B$ is in turn the reference temperature.

The sequence of a preferred position correction is summarized again below. The determination of the transport unit position of a transport unit TE results from the detected sensor signals of the available position sensors 18*i* and the known sensor positions $X_i$ relative to a reference point PB of the transport device 1. By means of the detected or modeled local segment temperatures $\vartheta_{Snj}$, for each expansion zone nj, the temperature-dependent sensor offset $\Delta X_i$ for each position sensor 18*i* can then be determined—preferably relative to a defined reference temperature $\vartheta_B$ (e.g.: $\vartheta_B$=30° C.).

The transport segment TS has, for example, a number j of equally large expansion zones nj, each having a specific length which corresponds, for example, to the sensor distance L (from sensor center to sensor center). A position sensor 18*i* is thus associated with each expansion zone nj. In addition, two expansion zones nj can be provided with a smaller length for the segment ends (e.g., L minus a specific sensor edge distance $L_R$<L). All available temperature sensors 19*i* (in this case every second sensor, which at the same time is position sensor 18 and temperature sensor 19) are read in by the control unit 6. The local segment temperature $\vartheta_{Snj}$ of an expansion zone nj in which a temperature sensor 19*i* is arranged can be directly detected by the corresponding temperature sensor 19*i*, i.e., $\vartheta_{Snj}=\vartheta_{Si}$. The local segment temperature $\vartheta_{Snj}$ of an expansion zone nj without its own temperature sensor 19*i* can be averaged from the adjacent temperature sensors 19*i*+1, 19*i*−1. The measured temperature of the temperature sensor 19*i* present in each case, for example, can be used as the segment temperature $\vartheta_{Snj}$ for the two expansion zones nj on the segment end.

Each sensor offset $\Delta X_i^+$, $\Delta X_i^-$ of a position sensor 18*i* can be determined by summing the length changes $\Delta L_{nj}$ of each expansion zone nj according to the above relationship $\Delta L_{nj}=K_{nj}{}^*(\vartheta_{Snj}-\vartheta_B)$ starting from the fixed bearing 12 for the corresponding sensor position $X_i$ in both directions. For the first half (to the left in FIG. 2), the following applies:

$$\Delta X_i^+ = +\sum \Delta L_{nj}$$

and, for the other respective other half (for example, to the right in FIG. 2), the following applies:

$$\Delta X_i^- = -\sum \Delta L_{aj}.$$

Additionally, according to the above relationship, $X_{offset}=K_P{}^*(\vartheta_P-\vartheta_B)$ a displacement $X_{offset}$ of the entire sensor plate 20 can be taken into account. The displacement $X_{offset}$ of the sensor plate 20 can then be added to the determined sensor offset $\Delta X_i$ as follows to a form a total sensor offset $\Delta X_{i\_gesamt}$: $\Delta X_{i\_gesamt}=X_{offset}+\Delta X_i$. The total sensor offsets $\Delta X_{i\_gesamt}$ thus determined can then be added to the sensor position $X_i$ known for the reference temperature $\vartheta_B$ according to the following relationship, in order to obtain the corrected sensor position $X_{i\_corr}$ of interest for a position sensor 18*i*:

$$X_{i\_corr} = X_i + \Delta X_{i\_gesamt}.$$

As mentioned at the outset, a cooling device (not shown) for cooling the transport segment TS can additionally also be provided. For this purpose, for example, a suitable heat sink can be provided between the drive coils 4 and the power electronics 17 in order to carry the heat generated during operation of the transport device 1 (e.g., by the drive coils 4 and/or the power electronics 17) away from the transport segment TS. A suitable heat exchanger through which a cooling medium flows can be provided as a heat sink, for example. The cooling device can optionally also be controlled via the control unit 6 of the transport device 1. For example, the (local) (actual) segment temperature $\vartheta_{Si}$ detected by the temperature sensors 19*i* could also be used in the cooling device as an actual value for regulating to a desired, predefined (target) segment temperature $\vartheta_S$.

The invention claimed is:

1. A transport device comprising:

at least one transport segment, along which at least one transport unit is moved at least one-dimensionally;

at least one sensor plate having a longitudinal extension parallel to a direction of movement of the transport unit;

a plurality of position sensors, which are spaced apart from one another in the direction of movement of the transport unit, are provided on the at least one sensor plate to generate a sensor signal, whenever the transport unit is in a sensor range of a corresponding position sensor;

a control unit, which is configured to determine a transport unit position of the transport unit relative to a defined reference point as a function of the sensor signals received from the position sensors; and at least one of:

a plurality of temperature sensors spaced apart from one another in the direction of movement of the transport unit is provided on the at least one sensor plate, the plurality of temperature sensors being configured for detecting a local segment temperature of the transport segment and/or a temperature model for calculating local segment temperatures is stored in the control unit, wherein the control unit is configured to correct the transport unit position based on the at least one of the detected or calculated local segment temperatures using a predefined correction model to take into account a thermal expansion of the transport segment.

2. The transport device according to claim 1, wherein the correction model comprises a temperature-dependent correction factor of the transport segment, and wherein the control unit is configured to multiply the determined transport unit position by the temperature-dependent correction factor to correct the transport unit position.

3. The transport device according to claim 1, wherein a sensor position for a predetermined reference temperature is determined for each of the plurality of position sensors, wherein the correction model comprises the determination of a sensor offset for each of the position sensors on the basis of the determined local segment temperatures, the reference temperature, and a predetermined expansion factor of the transport segment, and wherein the control unit is configured to determine a corrected sensor position for each position sensor based on the determined sensor offsets and to correct the transport unit position based on the corrected sensor positions.

4. The transport device according to claim 1, wherein at least one of:

at least one of the temperature sensors is arranged at the same position as one of the position sensors on the transport segment, and/or at least one of the position sensors and at least one of the temperature sensors are structurally combined.

5. The transport device according to claim 1, wherein the transport segment has a segment carrier, which is attached to a stationary guide device of the transport device by a fixed bearing, having a known attachment position relative to the defined reference point of the transport device, wherein the plurality of position sensors are arranged on the segment carrier, and in that the control unit is configured to correct the transport unit position starting from the attachment position.

6. The transport device according to claim 1, wherein one of:

at least one stator unit is provided, on the transport segment on which several drive coils are arranged one behind the other in at least one arrangement direction defining the direction of movement of the transport unit, and the drive coils are controlled by the control unit to interact electromagnetically with the transport unit to generate a drive force for an at least one-dimensional movement of the transport unit in the direction of movement, or a stator unit is provided on the transport segment on which several drive coils are arranged one behind the other in at least two different arrangement directions, which each define the direction of movement of the transport unit, and the drive coils are controlled by the control unit to interact electromagnetically with the transport unit to generate a drive force for an at least two-dimensional movement of the transport unit in two directions of movement.

7. The transport device according to claim 1, wherein the plurality of position sensors and/or the plurality of temperature sensors are arranged on a sensor plate running in parallel to the transport segment in the direction of movement of the transport unit, wherein the sensor plate is arranged on the segment carrier.

8. The transport device according to claim 5, wherein at least one of:

the stator unit is made of a ferrous material having a known coefficient of expansion, and/or the segment carrier is made of a material having a known coefficient of expansion, and the coefficient of expansion of the stator unit and/or the coefficient of expansion of the segment carrier are taken into account in the correction model.

9. The transport device according to claim 7, wherein the correction model comprises the determination of a displacement of the sensor plate based on a temperature of the sensor plate, on a displacement coefficient of the sensor plate, and on the reference temperature, and wherein the control unit is configured to determine a total sensor offset of the at least one position sensor from the displacement of the sensor plate and the determined sensor offset, and to use the total sensor offset to determine the corrected sensor position.

10. A method for operating a transport device having at least one transport segment, along which at least one transport unit is moved at least one-dimensionally, and at least one sensor plate having a longitudinal extension parallel to a direction of movement of the at least one transport unit and on which a plurality of position sensors, spaced apart from one another in the direction of movement, are provided, comprising:

generating sensor signals from each of the position sensors when the transport unit is moved into a sensor range of a corresponding position sensor, determining, via a control unit, a transport unit position of the transport unit relative to a defined reference point of the transport device on a basis of the sensor signals received from the position sensors, at least one of:

detecting with a plurality of temperature sensors that are spaced apart from one another in the direction of movement of the transport and that are arranged on the at least one sensor plate a local segment temperature of each transport segment, and/or local segment temperatures of the transport segment are determined by a temperature model of the transport segment implemented in the control unit, and correcting, via the control unit, the transport unit position based on the at least one of the detected or determined local segment temperatures using a predefined correction model to take into account a thermal expansion of the transport segment.

11. The method according to claim 10, wherein the correction model comprises a temperature-dependent correction factor of the transport segment, and wherein the control unit multiplies the determined transport unit position by the temperature-dependent correction factor to correct the transport unit position.

12. The method according to claim 10, wherein, a sensor position is determined for a predetermined reference temperature for each of the plurality of position sensors, in that the correction model comprises a determination of a sensor offset for each of the position sensors based on the determined local segment temperatures, the reference temperature and a predetermined expansion factor of the transport segment, and wherein the control unit determines a corrected sensor position for each position sensor based on the determined sensor offsets and corrects the transport unit position based on the corrected sensor positions.

13. The method according to claim 10, wherein at least one of:

at least one of the temperature sensors is arranged at a same position as one of the position sensors, and/or at least one position sensor and one temperature sensor are structurally combined.

14. The method according to claim 10, wherein the transport segment has a segment carrier, which is attached to a stationary guide device of the transport device with a fixed bearing having a known attachment position relative to the defined reference point of the transport device, wherein the plurality of position sensors are arranged on the segment carrier, and wherein the control unit corrects the transport unit position starting from the attachment position.

15. The method according to claim 10, wherein, a stator unit is provided on the transport segment on which several drive coils are arranged one behind the other in at least one arrangement direction defining a direction of movement of the transport unit, wherein one of:

the drive coils are actuated by the control unit to electromagnetically interact with the transport unit to generate a drive force, which moves the transport unit at least one-dimensionally in the direction of movement, or a stator unit is provided on the transport segment on which several drive coils are arranged one behind the other in at least two different arrangement directions, which each define a direction of movement of the transport unit, and wherein the drive coils are actuated by the control unit to electromagnetically interact with the transport unit to generate a drive force, which moves the transport unit at least two-dimensionally in the at least two directions of movement.

16. The method according to claim 10, wherein the plurality of position sensors and/or the plurality of temperature sensors are arranged on a sensor plate running in parallel to the transport segment in the direction of movement of the transport unit, wherein the stator unit and/or the sensor plate are arranged on the segment carrier.

17. The transport device according to claim 5, wherein the control unit is also configured to determine the sensor offsets of the position sensors starting from the attachment position.

18. The transport device according to claim 5, wherein the segment carrier is attached centrally in the direction of movement to a stationary guide device of the transport device by a fixed bearing.

19. The method according to claim 14, wherein the control unit also determines the sensor offsets of the position sensors starting from the attachment position.

* * * * *